United States Patent
Kambouris

(10) Patent No.: US 9,573,826 B2
(45) Date of Patent: Feb. 21, 2017

(54) RECOVERING WATER

(76) Inventor: Ambrosios Kambouris, Mildura (AU)

(*) Notice: Subject to any disclaimer, the term of this patent is extended or adjusted under 35 U.S.C. 154(b) by 294 days.

(21) Appl. No.: 13/008,895

(22) Filed: Jan. 18, 2011

(65) Prior Publication Data

US 2011/0287144 A1 Nov. 24, 2011

Related U.S. Application Data

(63) Continuation-in-part of application No. PCT/AU2010/000423, filed on Apr. 16, 2010.

(30) Foreign Application Priority Data

Jan. 17, 2010 (AU) ................................ 2010900154

(51) Int. Cl.

| | |
|---|---|
| C02F 1/44 | (2006.01) |
| C02F 1/42 | (2006.01) |
| C01B 5/00 | (2006.01) |
| C02F 1/28 | (2006.01) |
| A23L 2/70 | (2006.01) |
| A23L 2/08 | (2006.01) |
| A23L 2/74 | (2006.01) |
| A23L 2/80 | (2006.01) |
| C02F 103/32 | (2006.01) |
| C02F 1/00 | (2006.01) |

(Continued)

(52) U.S. Cl.
CPC ............. *C02F 1/441* (2013.01); *A23L 2/085* (2013.01); *A23L 2/74* (2013.01); *A23L 2/80* (2013.01); *C02F 1/281* (2013.01); *C02F 1/283* (2013.01); *C02F 1/001* (2013.01); *C02F 1/32* (2013.01); *C02F 1/44* (2013.01); *C02F 1/444* (2013.01); *C02F 1/78* (2013.01); *C02F 2101/30* (2013.01); *C02F 2103/32* (2013.01); *C02F 2103/325* (2013.01); *C02F 2303/24* (2013.01)

(58) Field of Classification Search
CPC ............ A23L 2/08; A23L 2/082; A23L 2/085; A23L 2/087; A23L 2/38; A23L 2/00; A23L 2/02; A23L 2/70; A23L 2/72; A23L 2/74; C02F 2103/00; C02F 2103/32; C02F 2103/325; C02F 2103/327; C02F 2303/24; C02F 2003/003; C02F 1/00
USPC ...... 426/66, 599, 495, 590, 422, 330.3, 490, 426/271, 330.5, 492, 489, 51

See application file for complete search history.

(56) References Cited

U.S. PATENT DOCUMENTS

| 2,773,774 A | 12/1956 | McCarthy et al. |
| 3,436,343 A * | 4/1969 | Smith .......................... 210/673 |

(Continued)

FOREIGN PATENT DOCUMENTS

| DE | 19800335 A1 | 7/1999 |
| EP | 1424122 | * 9/2002 |
| WO | WO-2009/155675 A2 | 12/2009 |

*Primary Examiner* — Erik Kashnikow
*Assistant Examiner* — Lela S Williams
(74) *Attorney, Agent, or Firm* — Birch, Stewart, Kolasch & Birch, LLP

(57) ABSTRACT

A method of recovering palatable potable storable water from a process for concentrating an extracted juice, the method including the steps of: providing the extracted juice; concentrating the extracted juice to form a concentrated juice stream and a concentrator waste stream, wherein the concentrator waste stream is not palatable, potable or storable; and purifying the concentrator waste stream to provide palatable potable storable water including the step of passing the concentrator waste stream through activated carbon.

16 Claims, 3 Drawing Sheets

(51) Int. Cl.
  *C02F 1/32*    (2006.01)
  *C02F 1/78*    (2006.01)
  *C02F 101/30*  (2006.01)

(56) References Cited

U.S. PATENT DOCUMENTS

| | | | |
|---|---|---|---|
| 5,403,604 A * | 4/1995 | Black, Jr. ................. | A23L 2/74 |
| | | | 426/330.5 |
| 5,534,274 A | 7/1996 | DeStefano | |
| 6,709,585 B1 * | 3/2004 | Garcia Portillo et al. .... | 210/202 |
| 7,618,671 B2 * | 11/2009 | Corbin et al. ................ | 426/634 |
| 2004/0067156 A1 | 4/2004 | Eldred | |
| 2005/0274675 A1 | 12/2005 | Naito et al. | |
| 2007/0199894 A1 * | 8/2007 | Peyton et al. ................ | 210/603 |
| 2009/0155675 A1 | 6/2009 | Houchin-Miller | |
| 2009/0308793 A1 | 12/2009 | Van Der Merwe et al. | |
| 2010/0009038 A1 | 1/2010 | Ella et al. | |

\* cited by examiner

– 1 –

RECOVERING WATER

This application is a Continuation-in-Part of International Application No. PCT/AU2010/000423 filed on Apr. 16, 2010 and claims priority under 35 U.S.C. §120. This Application also claims priority under 35 USC §119 (a)-(d) of Application No. 2010900154 filed in Australia on Jan. 17, 2010, and Application No. 201010080 filed in Australia on Jul. 27, 2010, which was granted as Australia Patent No. 201010080 on Aug. 26, 2010.

FIELD OF THE INVENTION

The invention relates to the recovery of water from fruit and/or vegetable juice and/or sugar cane juice. In particular, the invention relates to the recovery of water from juice extracted from fruit and/or vegetables and/or sugar cane, and especially from the waste stream formed during concentration of extracted juice.

BACKGROUND OF THE INVENTION

Fruit juices contain about 85 wt %, or more, water, with the remaining composed of volatile organic compounds, organic acids, aroma, flavour, sugars and fibre, as well as many other constituents in trace quantities. The extraction of juice from fruit or vegetable is a common industrial activity. The extracted juice is typically concentrated to form a concentrated juice using one or more of several commercial processes, some more efficient than others.

The process of concentrating the extracted juice to form a concentrated juice also forms a concentrator waste stream. The composition of this concentrator waste stream varies and is contingent on the efficiency of the concentration process, and may have the characteristic smell and/or taste of the fruit or vegetable or sugar cane juice from which it originated. That is, a less than 100% efficient concentration process (where all non-water constituents are desirably retained with the concentrated juice) results in a concentrator waste stream that is predominantly water but which also contains some source fruit or vegetable or sugar cane constituents. Typical carry over constituents include aroma and other volatiles, organic acids, and sugars; the exact composition contingent on the separation process used. In practice, 100% efficiency of the concentration process is not achieved.

Due to the organic contaminants, this concentrator waste stream is susceptible to fouling due to oxidation and microbial contamination. Thus, if later use of the concentrator waste stream is desired it is necessary to add preservatives. For instance, the concentrator waste stream may be used in the wine industry if preserved through acidification and sulphur dioxide addition, but even this only offers a short term storage solution. Most typically, the concentrator waste stream is discarded as waste water.

WO94/19967 relates to the use of the concentrator waste stream as potable water. In this document it is stated that it is desirable to provide a process for providing pure water which can be distributed to the consumer. However, the only such process referred to in the document is a particular process for concentrating extracted juice, namely a four stage evaporation system, and the process for providing pure water is merely the condensation of steam from this evaporation system. Pasteurisation, micro-filtration, and/or carbonation are optional post-processing steps.

WO2009/155675 describes processes to recover water in the context of commercial sugar production and ethanol production and is not directed to processes for recovering water from a process stream having a relatively high concentration of sugar.

US2005/308793 describes processes for treating an oil shale and is not relevant to the field of the present invention.

US2010100090 and US2005/0274675 are directed to process for producing a product from water that is already potable. These processes are therefore unsuitable for treating a water that is not potable, not suitable or is not palatable.

It is desirable to provide a process for recovering potable storable water from a concentrator waste stream formed in a process of concentrating an extracted juice, particularly in instances where the concentrator waste stream is not already potable storable water upon formation.

The discussion of documents, acts, materials, devices, articles and the like in this Background section is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

The following is the outline of a process of making potable water for human consumption/packaging.
1. Crush fruit or vegetables or sugar cane to release or expose the internal constituents. Or use juices supplied.
2. Process the above (step 1) slurries/juice through commercially available evaporators to produce a concentrate and LSJ fraction. Not all evaporators are designed to prevent external water contamination of the LSJ so it is preferable to use evaporators that do not contaminate LSJ in this way i.e. the Centritherm.
3. Pass the crude LSJ through ion exchange resin preferable cationic followed by anionic resin. This removes a fraction of the total organic constituents in the LSJ and adjusts the pH of the LSJ to the level required.
4. LSJ from step 3 is then passed through a reverse osmosis unit with low molecular weight cut off membranes, such as those used for sea water purification or nano-filtration to achieve the removal of most of the aroma components of the LSJ.
5. LSJ from step 4 can be filtered through activated carbon to remove fruit or vegetable or sugar cane aroma or odours further.
6. LSJ after this process can be stored in preferable stainless steel tanks and maintained sterile with UV radiation lamps, ozone and or filtration.
7. Just before packaging the basic botanically derived water, it is again filtered through activated carbon.

The above process can be carried out in stages and even be done in different sequences to achieve similar results.

The use of this purified LSJ can be:
1. Pure, still without further additions.
2. Mineral fortified, carbonated or still.
3. Still with vitamins/herbal extracts and other plant derived additions.
4. Aromatised, flavoured for market acceptance.

In one aspect of the invention there is provided a method of recovering palatable potable storable water from a process for concentrating an extracted juice, the method including the steps of:

providing a concentrator waste stream from a concentrator for concentrating extracted juice, the concentrator waste stream being unpalatable, non-potable and/or unsuitable for storage; and purifying the concentrator waste stream to provide palatable potable storable water including the step of passing the concentrator waste stream through activated carbon.

The steps of purifying the concentrator waste stream preferably further includes the step of filtering the waste if particulate material greater than 0.1μ is present in the waste stream. The purification may further include the steps of subjecting the waste stream to reverse osmosis particularly if molecules larger than 100 daltons are present and contacting the resulting waste stream with activated carbon. The activated carbon may be biological or organic activated carbon. In the preferred embodiment, the steps of filtration, reverse osmosis and contact with activated carbon are carried out sequentially if the properties of the waste stream warrant such treatment. For example if no particulate material greater than 0.1μ exist then a filtration step is not required. However in the majority if not all cases it will be required. Similarly a reverse osmosis step will not be required if the waste stream does not contain molecules greater than 100 daltons. Other optional steps may also be included such as ozone treatment.

In another aspect of the invention there is provided palatable potable storable water produced using the method of the above aspect.

In another aspect of the invention there is provided bottled water including the palatable potable storable water of the above aspects.

The concentrator waste stream typically contains fruit or vegetable or sugar cane carry over from the extracted juice and is thus referred to by industry as low sugar juice (LSJ). In the context of this invention, LSJ is concentrator waste which is water which is non-potable and/or non-palatable and is unfit for storage. That is, the concentrator waste stream contains some of the components of the original juice, including sugar. Other components of the concentrator waste stream include volatiles (e.g. low molecular weight aroma constituents) and other organics (e.g. malic acid, lactic acid, other organic acids, tannins, phenolics sugars, protein, etc.).

These carried over constituents can be considered 'contaminants' in the present context as they either render the concentrator waste stream non-potable and/or non-storable, and/or affect the taste and aroma of the concentrator waste stream such that a consumer would not consider the concentrator waste stream palatable.

The concentrator waste stream typically has:

Aroma/odour constituents that exceed odour #3A, and/or exceeds the threshold odour acceptable for drinking water;

Apparent colour or absorbance of more than the sum of the spectrophotometric absorbance at 420 nm and 520 nm of laboratory grade reverse osmosis water when measured through a quartz cuvette having a pathlength of 1 cm, or about 15 units.

About 0.05 to 0.15° Bx sugar, or about 0.005 to 0.15° Bx sugar;

Taste unacceptable as water;

About 300 to 800 ppm total dissolved solids (TDS) or about 30 to 800 ppm TDS;

About 400 to 2350 ppm, or about 30 to about 2350 ppm total organic carbon (TOC); and Turbidity about 1.1 NTU, or more than about 0.8 NTU.

The presence of one or more of the above constituents, at certain threshold quantities is dependent on the presence or absence of other constituents, can render the colour, aroma and/or taste profile of the concentrator waste stream non-potable and/or non-storable, and/or un-palatable in that it would not be acceptable to a consumable. Thus, in some circumstances an otherwise potable concentrator waste stream may remain unpalatable due to taste or aroma contaminants.

Likewise, certain of the above constituents may be biologically and/or chemically degradable and hence the concentrator waste stream would not be storable.

Odour, taste and colour are the primary criteria consumers use to judge the quality and acceptability of drinking water. Taste and odour in drinking water can be naturally occurring, or the result of chemical contamination of water supplies. The present invention is different to most prior art in that the water is sourced from within a fruit and/or vegetable and/or sugar cane, rather than from a spring or groundwater source. In this instance, taste and odour are primarily the result of compounds naturally occurring in the fruit and/or vegetable and/or sugar cane. However, presence of pesticides used during the growing of the fruit and/or vegetable and/or sugar cane may be monitored in the final product.

While taste and odour are subjective measures, there are internationally recognised ways to grade liquids qualitatively. A small panel (5 to 8 people) can be trained to identify specific odours and tastes associated with common contaminants. These panels are useful for assessing complaints by consumers, identifying the source of a contaminant, and for the initial assessment of a new or improved purification process.

The Flavour Profile Measurement method (Krasner et al. 1985, Bartels et al. 1987, Mallevaille et al. 1987) is widely recognised as the appropriate procedure for use with small trained panels when assessing drinking water. It provides information on both the strength and characteristics of the odour and taste of the water.

Large panels (over 100 people), generally consisting of consumers, can be used as final assessors of water from a new or improved process, or to check that a contaminant causing complaint has been removed or reduced to a concentration that renders water acceptable for drinking.

The Flavour Rating Assessment method (Zoetman et al. 1984, APHA Method 2160C 1992) uses a simple rating scale for acceptance of water.

Additionally, odour constituents are identifiable at 200-400 nm via spectrophotometry.

Colour can either refer to 'true colour', the colour after turbidity has been reduced to sufficient levels, or 'apparent colour', what one actually sees. In natural waters, as in the present invention, colour is due mainly to the presence of dissolved organic matter. In the present invention, colour might result from the presence of anthocyanins present in fruit or vegetables or sugar cane or equipment process contamination.

Colour can be measured spectrophotometrically or using a visual comparator. In both cases, the standard unit of measurement is the hazen unit (HU). True colour is often quoted as True Colour Units, or TCU; however, the numerical values are identical. Hazen units are defined in terms of a platinum-cobalt standard (APHA Method 2120B 1992). This standard was developed for the analysis of colour in natural waters with a yellow-brown appearance, and is not applicable to waters with different colours. It is advisable to record the pH with the colour measurement, as the colour of natural surface waters increases with pH. Colour values obtained using a spectrophotometer are dependent on the wavelength used for the measurement. There is no standard wavelength used in Australia, but values ranging from 395 nm to 520 nm are generally used. The British Standard uses 436 nm (BSI Method BS6068 1986).

As a guide, tea has a colour of about 2500 HU. A true colour of 15 HU can be detected in a glass of water, but few people can detect a true colour level of 3 HU and a true colour of up to 25 HU would probably be accepted by most people provided the turbidity was low. If both true colour and turbidity were at values of true colour of 15 HU and turbidity of 5 NTU (see below for discussion of NTU), the apparent colour could be 20 HU, which is considered acceptable.

An alternative approach to measuring colour is to use the spectrophotometric analysis of the LSJ and compare it to purified laboratory grade water (reverse osmosis) or potable water (in any region and definition). Briefly, the spectrophotometric test is carried out using a quartz cuvette with a 1 cm path length and determining the absorbance at A280, A420 and optionally A520. A280 is the indicator for phenolic colour, A420 and A520 determined visible colour. The sum of these 2 or 3 absorbances of pure lab water or other potable water would be the reference point to achieve with the processed LSJ.

Sugar is present in the concentrator waste stream of the present invention, particularly for extracted juice from fruits and sugar cane. Sugar would not normally be present in most prior art related to treatment of waters which are sourced from a spring or groundwater source.

Degrees Brix (symbol ° Bx) is a measurement of the fraction of sugar per hundred parts aqueous solution, by mass. It is measured via specific gravity or with a refractometer. For example, a 25° Bx solution is 25 wt % sugar, or 1 part sugar to 3 parts water. For juices extracted from fruits, the concentrator waste stream may contain about 0.05 to 0.15° Bx sugar. For juices extracted from vegetables, the concentrator waste stream may contain about 0.05 to 0.15° Bx sugar, or about 0.005 to 0.15° Bx sugar. Typically, the concentrator waste stream from fruit juice contains more sugar than from vegetable juice.

Total dissolved solids (TDS) in non-mineral fortified processed concentrator waste stream the levels can range, in some instances, from about 9 ppm to 30 ppm, or from about 9 ppm to about 1000 ppm.

Total organic carbon (TOC) may contain an amount in the range of between 400 to 2350 ppm.

Turbidity is caused by the presence in the water of fine suspended matter and can result in a water sample having a 'cloudy' appearance. Turbidity is a measurement of the light scattering property of water, and the degree of scattering is dependent on the amount, size and composition of the suspended matter. The present invention is different to most prior art in that the water is sourced from within a fruit and/or vegetable and/or sugar cane, rather than from a spring or groundwater source where turbidity would result from clay, silt, colloidal particles, plankton and/or other microscopic organisms. In the present invention, turbidity might result from fruit or vegetable or sugar cane solids carried over avoiding separation or microbial or particulate matter.

The nephelometric turbidimeter is the preferred method for turbidity measurement. Results are expressed in nephelometric turbidity units (NTU) and are calibrated. As a guide, water with a turbidity of 5 NTU would appear slightly cloudy in a glass. It would not be possible to see through the glass if the turbidity was over 60 NTU. 'Crystal' clear water usually has a turbidity of less than 1 NTU.

The concentrator waste stream is a liquid stream that does not have a similar colour, taste and/or aroma profile to drinking water, as would be determined by a qualified tasting panel (as discussed further below) and/or appropriate measurement methods (as discussed above).

Guidelines/regulations exist in each country that define potable water. In addition to these guidelines/regulations, there is also a human element that determines what taste and aroma profile is palatable. Sometimes, the guidelines/regulations include this human element, requiring potable water to also meet certain aesthetic criteria. Further, bottled water may be subjected to stricter controls than simple drinking water supplied to a consumer from a domestic tap. The 1984 WHO Guidelines require that water not be objectionable to most consumers. The 1993 WHO Guidelines require that taste and odour be acceptable to avoid consumer complaints.

In Australia, for example, standard drinking water must be in accordance with the Australian Drinking Water Guidelines while bottled water is regulated under the stricter Standard 2.6.2 of the Food Standards of Australia New Zealand. In the Australian Drinking Water Guidelines In Standard 2.6.2, water presented in packaged form currently must not include more than amount identified below for each of the substances:

Arsenic 0.05 mg/L, Barium 1.0 mg/L, Borate 30 (calculated as $H_3BO_3$) mg/L, Cadmium 0.01 mg/L, Chromium VI 0.05 mg/L, Copper 1.0 mg/L, Cyanide 0.01 (calculated as CN—) mg/L, Fluoride (naturally occurring) 2.0 (calculated as F—) mg/L, Lead 0.05 mg/L, Manganese 2.0 mg/L, Mercury 0.001 mg/L, Nitrate 45 (calculated as $NO_3$-) mg/L, Nitrite 0.005 (calculated as $NO_2$-) mg/L, Organic matter 3.0 ($KMnO_3$ digested as $O_2$) mg/L, Selenium 0.01 mg/L, Sulphide 0.05 (calculated as $H_2S$) mg/L, or Zinc 5.0 mg/L.

The palatable potable storable water of the present invention typically has:

Aroma/odour constituents of less than odour #3A and/or exceeds the threshold odour acceptable for drinking water;

Apparent colour or absorbance of more than the sum of the spectrophotometric absorbance at 420 nm and 520 nm of laboratory grade reverse osmosis water when measured through a quartz cuvette having a pathlength of 1 cm, or about 15 units;

Less than about 0.1° Bx sugar, or less than about 0.005° Bx sugar.

Taste acceptable and comparable to local potable drinking water

Less than about 50 ppm total dissolved solids (TDS);

Less than about 600 ppm total organic carbon (TOC); and

Turbidity less than about 0.5, preferably less than about 0.5 NTU.

In the present invention, the main criteria by which the concentrator waste stream fails to be the potable, or acceptable as water, is its taste and aroma. It is not necessary that there be no taste, and/or no aroma, but to be potable the taste and aroma should be aesthetically pleasing to most consumers.

The step of purifying the concentrator waste stream to provide palatable potable storable water involves ensuring turbidity/colour, taste and aroma are suitable for the water to qualify as palatable potable storable water (as discussed above).

Turbidity is essentially the presence of particulates in the concentrator waste stream, and thus can be controlled through the use of filtration. This can be achieved either by, for instance, multimedia filtration, micro-filtration and/or ultra-filtration. Diatomaceous earth is preferably avoided due to the release of alumina-silicates into the concentrator waste stream that subsequently become visible in the final palatable potable storable water. Cross flow filtration to remove microorganisms, and particulate matter including alumina-silicate particles, may be used.

Non-volatile organic compounds, predominantly, contribute to the taste profile of the concentrator waste stream. Reverse osmosis through a tight membrane (100 daltons), reduces the components in LSJ that contribute in taste. These components include, sugar, non-volatile organic acids, tannins, phenoics and others. The reverse osmosis unit suitable is one with low molecular weight cut off membranes (e.g. 90 daltons), such as those used for sea water purification or nano-filtration, which will allow only constituents such as malic acid lactic acid, ethyl acetate, acetic acid, ethanol, is acetaldehyde, CO2 and water to pass through the membrane, whilst separating out, for instance, tartaric acid, volatile phenols, tannins, proteins, sugars and flavanoids.

In addition to, or as an alternative to using reverse osmosis for reducing the brix in the raw LSJ, an adsorbent that binds sugars such as glucose and fructose may be used. Preferably this sugar-binding adsorbent exhibits at least partial selectivity toward sugar molecules over other components in the process stream. In one embodiment of the method, the sugar-binding adsorbent is a microporous solid capable of exchanging bound ions with ions in the environment. Typically, such solids a capable of exchanging a cationic species such as $Na^+$, $K^+$, $Ca^{2+}$, and $Mg^{2+}$. Without wishing to be limited by theory in any way, it is thought that the ability of microporous solids to selectively bind molecules is based primarily on a size exclusion process; this property being due to a very regular pore structure of molecular dimensions. The maximum size of the molecular or ionic species that can enter the pores of a microporous solid is controlled by the dimensions of the channels. These are conventionally defined by the ring size of the aperture, where, for example, the term "8-ring" refers to a closed loop that is built from 8 tetrahedrally coordinated atoms. For example, the loop may be formed from 8 tetrahedrally coordinated silicon (or aluminum) atoms and 8 oxygen atoms.

In one embodiment, the sugar-binding adsorbent is naturally occurring substance, such a mineral, with preferred minerals being a zeolite. Zeolites are aluminosilicate members of the family of microporous solids, with more common members being analcime, chabazite, clinoptilolite, heulandite, natrolite, phillipsite, and stilbite. An example mineral formula is: $Na_2Al2Si_3O_{10}.2H_2O$, the formula for natrolite. Naturally occurring zeolites are rarely pure and are contaminated to varying degrees by other minerals, metals, quartz, or other zeolites. For this reason, naturally occurring zeolites are excluded from many commercial applications where uniformity and purity are essential. Contrary to this accepted view on the commercial utility of zeolites, Applicant proposes that these minerals have applicability to the present methods providing an efficacious and economical means for decreasing sugar content.

One advantage of using a sugar-binding adsorbent (as compared with reverse osmosis) is that sugar is removed more specifically from the raw LSJ. Such processed LSJ has more plant derived nutrients and minerals than LSJ treated with reverse osmosis.

The sugar-binding adsorbent may be placed in-line at any convenient point in the process stream, but is preferably used to treat the flow of raw LSJ to remove the glucose, fructose and other sugars when these are at low concentration.

Following removal of sugar from the raw LSJ by adsorption, it may still be necessary to treat the LSJ further using activated carbon in order to achieve potable water.

Volatile organic compounds contribute to the aroma profile of the concentrator waste stream. Such volatile organics are usually compounds such as ethyl acetate, acetic acid, ethanol, and acetaldehyde etc. The remaining constituents in LSJ that contribute to aroma, i.e. low molecular weight volatile organic components are readily removed by activated carbon, either powdered or granular activated carbon. The preferred method of carbon treatment of the LSJ is the use of biologically activated carbon (BAC). This BAC has a microbial population that consumes and survives on the organic constituents that bind to the activated carbon, effectively regenerating the filtration media as it is used. To make the organic constituents more easily biodegradable, the LSJ is treated with ozone prior to BAC filtration.

The liquid passing completely through the BAC is devoid of the source juice taste and aroma and can not be deciphered from most bottled drinking waters. The leakage of microbial activity from the BAC into the final water fraction can be destroyed by UV light or removed by 0.22 micron filtration.

In one embodiment, where the turbidity is less than about 0.5 NTU, but where other contaminants render the water not palatable, potable and/or storable, the step of purifying the concentrator waste stream to provide potable storable water may involve only reverse osmosis and activated carbon.

In one embodiment, where the level of sugar is less than about 0.13° Bx, or less than about 0.005° Bx, but where other contaminants render the water not palatable, potable and/or storable, the step of purifying the concentrator waste stream to provide potable storable water may involve only nano-filtration and activated carbon.

In another embodiment, the step of purifying the concentrator waste stream to provide potable storable water may involve only filtration, reverse osmosis or nano-filtration, and activated carbon.

In some embodiments, freezing the concentrator waste stream can be employed to purify the water.

In some embodiments, ozone treatment prior to use of activated carbon is preferred to assist with removal of aroma producing components of the concentrator waste stream. In particular, ozone treatment may enhance the efficiency of aroma removal by the carbon by converting them to a more biodegradable form.

In some embodiments, ion exchange treatment prior to reverse osmosis is preferred to assist with removal of organic compounds and adjustment of the pH. Electrodeionisation ion exchange can be used to remove charged particles if required.

Preferably, a cationic ion exchange resin is first used and is followed by an anionic ion exchange resin.

One or more of the following further processes can be carried out to maintain aseptic/sterile conditions, including: Chlorine dosing, UV sterilisation, Ozone sterilisation, and Ultra filtration. Filtration can be done either before and/or after the other treatment processes, or indeed be one of the other treatment process (i.e. to control both particulate matter and bacteria in one step). UV sterilisation could be used to help prevent fouling of the reverse osmosis and/or nano-filtration membranes by microorganisms.

The palatable potable storable water produced by the present invention may be stored before bottling, preferably in stainless steel tanks and sterility maintained with UV radiation lamps, ozone and/or filtration.

The palatable potable storable water produced by the present invention may be used (a) pure, still without further additions, (b) mineral fortified, carbonated or still, (c) aromatised and/or flavoured for market acceptance, or (d) with vitamins/herbal extracts and other plant derived additions.

Prior to bottling, the palatable potable storable water may again be filtered through activated carbon.

In all situations, treatment with activated carbon to remove aroma components is necessary. It is also preferable that treatment with reverse osmosis to remove odour components also be conducted. Then, it is preferable that reverse osmosis be conducted prior to activated carbon treatment to reduce saturation of the activated carbon. Alternatively or additionally, a filtration step prior can be included to reduce fouling of the activated carbon.

In more preferred embodiments, a filtration step is included, as well as the reverse osmosis step, to remove larger contaminants. Pre-filtration, between 0.1 and 0.22 micron in size is preferred to remove particulates such colloidal particles and microbes respectively. This reduces the risk of the reverse osmosis (RO) membrane from blocking and fouling. It is preferable that the filtration be conducted before the other steps in order to reduce fouling in those steps.

In the most preferred embodiment, the concentrator waste stream is processed with the following steps in the following order, to:
  Reduce turbidity, using filtration. Reducing turbidity, if turbidity is originally greater than 0.5 NTU as determined by nephelometric turbid meter, is preferable;
  Reduce the concentration of non-volatile organic compounds that contribute to taste, e.g. sugar, tannins, phenolics and organic acids, using Reverse Osmosis; and
  Reduce volatile low molecular weight constituents that contribute to aroma using selected activated carbon.

The above processes can be optimized for each batch or variety of LSJ so that the final LSJ will have specifications as required, e.g. close to that of local potable water. Finally, the treated LSJ can be assessed for aroma and taste acceptance.

Reducing sugar to less than 0.1 brix or less than 0.005 brix, which can be achieved by either GAC or RO or a combination of both is preferred. If the sugar contamination is significantly higher, RO would be the choice of initial treatment in order not to saturate the GAC.

Preferably, TOC is reduced to below 1000 mg/L by either GAC or RO or a combination of both.

The liquid fraction that remains after fruit or vegetable or sugar cane juices have been concentrated commercially is referred to as LSJ (low sugar juice). The processes that produce concentrate and hence LSJ are several including evaporation, filtration (Reverse Osmosis) and freeze concentration. When this LSJ has either taste or aroma that differs from neutral water, the following process is carried out as below and as per FIG. 3:
  1. Pre-filtration, between 0.1 and 0.22 micron in size is required to remove particulates such colloidal particles and microbes respectively. This reduces the risk of the reverse osmosis (RO) membrane from blocking and fouling.
  2. Reverse osmosis (RO) through a tight membrane (90 daltons), reduces the components in LSJ that contribute in taste. These components include, sugar, non-volatile organic acids, tannins, phenoics and others.
  3. The remaining constituents in LSJ that contribute to aroma i.e. low molecular weight volatile organic components are readily removed by activated carbon, either powdered or granular activated carbon (GAC). The preferred method of carbon treatment of the LSJ is the use of biologically activated carbon (BAC). This BAC has a microbial population that consumes and survives on the organic constituents that bind to the activated carbon, effectively regenerating the filtration media as it is used. To make the organic constituents more easily biodegradable, the LSJ is treated with ozone prior to BAC filtration.
  4. The liquid passing completely through the BAG is devoid of the source juice taste and aroma and can not be deciphered from most bottled drinking waters. The leakage of microbial activity from the BAC into the final water fraction can be destroyed by UV light or removed by 0.22 micron filtration.
  5. The water is suitable for bottling and human consumption.

The step of concentrating the extracted juice aims to remove water in order to reduce the volume of the fruit constituents. The step may be conducted using any commercially available concentrator or concentration process. For instance, evaporation, reverse osmosis, and/or freezing of the water component may be used. Concentrators that are designed to keep separate the LSJ and any external water, and which usually apply steam for heating, are preferred i.e. for instance, the Centritherm®.

The extracted juice may be provided as juice previously extracted from fruit(s) and/or vegetable(s) and/or sugar cane(s). That is, the extracted juice may be supplied from a commercial source. Alternatively, the juice may be extracted as part of the present invention. The juice may be extracted using any means known in the art. For instance, fruit and/or vegetables and/or sugar cane may be crushed to release or expose their internal constituents. The juice may be from any fruit and/or vegetable and/or sugar cane type.

DETAILED DESCRIPTION OF THE EMBODIMENTS

Examples

Example 1

Figure 1:
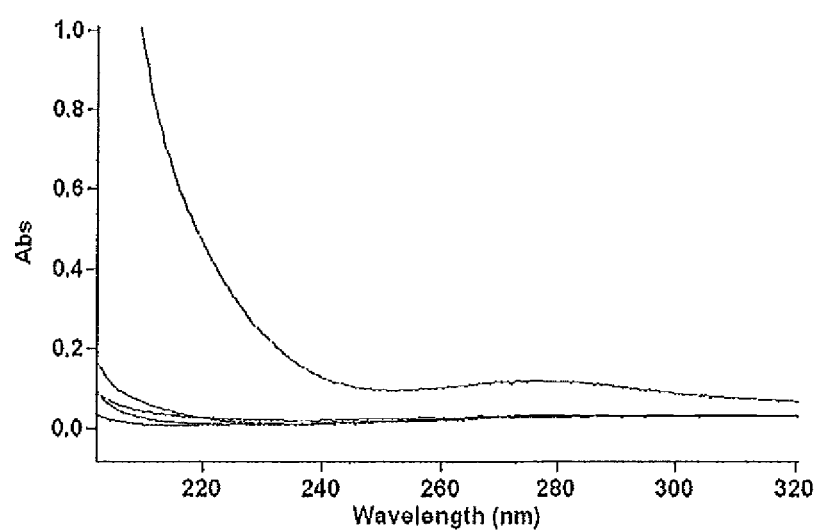
FIG. 1 Spectrophotometric analysis of the effect of treatments of Example 2 within the 200 nm to 320 nm wavelength range.

Recovering Palatable Potable Storable Water from Grape-Derived LSJ

TABLE 1

Change in composition of raw grape LSJ following processing with reverse osmosis and activated carbon. Final composition is treated LSJ fortified with mineral formula and carbonation.

| Constituent | Abbreviation | Units | Raw LSJ | Treated LSJ | Final composition |
|---|---|---|---|---|---|
| TDS | | Mg/litre | 375 | 27.0 | 993 |
| Hardness | CaCO3 | Mg/litre | 2 | 16 | |
| pH | | | 2.9 | 6.1 | 5.6 |
| Bicarbonate | | Mg/litre | 0.0 | | 311 |
| Calcium | Ca | Mg/litre | 0.3 | 5 | 170 |
| Chloride | Cl— | Mg/litre | 10.0 | 0 | 187 |
| Magnesium | Mg | Mg/litre | 0.2 | 0.9 | 60 |

TABLE 1-continued

Change in composition of raw grape LSJ following processing with reverse osmosis and activated carbon. Final composition is treated LSJ fortified with mineral formula and carbonation.

| Constituent | Abbreviation | Units | Raw LSJ | Treated LSJ | Final composition |
|---|---|---|---|---|---|
| Manganese | Mn | Mg/litre | 0.0 | | 0.02 |
| Potassium | K | Mg/litre | 56.2 | | 3 |
| Sodium | Na | Mg/litre | 3.2 | 1.9 | 34 |
| Sulphate | SO4 | Mg/litre | 80.6 | <5 | 375 |
| TOC | | Mg/litre | 600 | 230 | 230 |
| Fluoride | F | Mg/litre | 9 | | 0.49 |
| Iron | Fe | Mg/litre | 0.1 | | 0.16 |
| Nitrate | NO3 | Mg/litre | 0.0 | | 0.02 |
| Selenium | Se | Mg/litre | 0.1 | | |
| Silver | Ag | Mg/litre | 0.0 | | |
| Zinc | Zn | Mg/litre | 0.0 | | |

The Heterotrophic plate count (most probable number (MPN)/100 ml) was 2, Total coliforms (MPN/100 ml) was 0. *E-coli* (MPN/100 ml) was 0.

The above represents only one example of the process that can convert raw LSJ into a desirable carbonated water drink that has higher sodium levels. Sodium levels are related to the hydration properties of the water, the higher the sodium, the quicker the rate of hydration. In this simple example raw LSJ has been made into stable water suitable for human consumption but in addition, the taste has been enhanced further as was the functionality by fortification with minerals.

Example 2

Assessing Properties

Objective analysis of the quality of LSJ and the type of treatment required to optimise its composition to a level of acceptance for storage, potability and/or palatability can be achieved using spectrophotometer analysis. The example here demonstrates how raw grape-derived LSJ produced by the process of evaporation of grape juice can be assessed, and the appropriate treatment determined.

In the following example, several constituents were determined for the following treatments and reference samples:
1. Purified laboratory water.
2. Raw grape LSJ without further treatment
3. Raw grape LSJ treated with granular activated carbon (GAC).
4. Raw grape LSJ treated by reverse osmosis then GAC.
5. Potable Australian tap water.

Table 2 below, follows the constituent levels of grape derived raw LSJ and the effect of the different processing steps. It offers a comparison between all these treatments and laboratory purified water and potable tap water. The results showed that activated carbon treatment affected favourably the aroma and taste of the raw LSJ as well as reducing the brix (although to a lesser amount).

The presence of sugar in the LSJ is a substrate for further fermentation and oxidation and the reason for the LSJ instability during storage. Alcohol production or even acetaldehyde products from sugar can also affect the taste and aroma of the LSJ.

Therefore, reducing brix to as low as possible is important if storage of the treated LSJ is required outside a bottle (e.g. in stainless steel tanks) that has exposure to oxygen.

Treatment 4, which combines both RO and GAC reduces the level of sugar in the LSJ the most, and in this example, a level of 0.05 brix in the LSJ did not affect the taste or aroma of the LSJ even after 1 year of storage in an air exposed stainless steel tank.

Treatment 3, using only GAC, also reduces the brix content of the raw LSJ and removes the unpleasant taste and aroma profile of the raw LSJ.

With this evidence, if the LSJ produced is less than 0.13 brix, or less than 0.005 brix, the only treatment that will be required would be activated carbon treatment. If the brix exceeds this 0.13 brix level, it may be necessary to carry out both RO and GAC treatment to stabilise the LSJ for long term storage.

TABLE 2

| Constituents | 1 | 2 | 3 | 4 | 5 |
|---|---|---|---|---|---|
| Colour (A420 + A520), 1 cm path length | 0 | 0.01 | 0 | 0 | 0 |
| Brix (refract meter) | 0 | 0.13 | 0.09 | 0.05 | 0 |
| Turbidity (Nephelometry) | 0 | 1.07 | | 0.282 | |
| Malic acid (mg/L)-Enzymatic | 0 | Not detected | Not detected | Not detected | Not detected |
| pH | | | | 5.91 | 8.87 |
| TA (end point 8.2)-g/L | | | | 0.02 | 0 |
| Aroma-panel | | neutral | unpleasant | neutral | neutral | neutral |
| Taste | | acceptable | unacceptable | acceptable | acceptable | acceptable |

The effect of processing on total dissolved solids (TDS) and total organic carbon (TOC) were determined and are shown in Table 3 below. TDS and TOC were reduced by both RO and by GAC. The aroma and taste profile of the raw LSJ was borderline after GAC treatment alone but totally acceptable after both RO and GAC treatments combined. From such work, it would be necessary to use both RO and GAC treatment in combination when the TOC is above 1000 mg/l in the raw LSJ.

TABLE 3

| Treatment | TDS (mg/L) | TOC (mg/L) | Taste/aroma |
|---|---|---|---|
| 2 | 115 | 2333 | unacceptable |
| 3 | 75 | 1438 | borderline |
| 4 | 9 | 474 | acceptable |
| 5 | 10 | 35 | acceptable |

Spectrophotometric analysis of the effect of each of the above treatments was determined within the 200 nm and 700 nm wavelength range. This spectral range allows for the detection of colour or pigmentation as well as the presence of organic constituents. The spectrophotometer was zeroed using ultra pure laboratory water and a quartz, 1 cm path length, curette was used.

Figure 2:
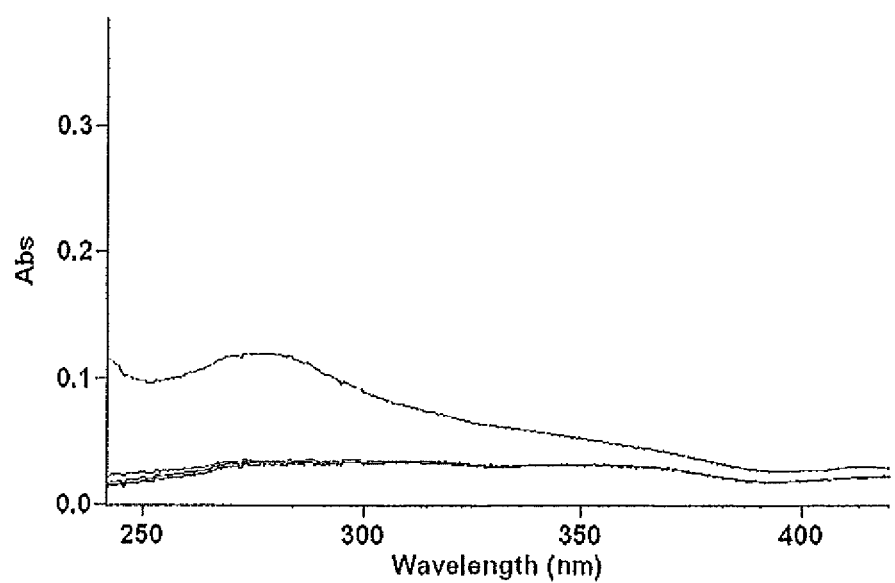
FIG. 2 Spectrophotometric analysis of the effect of treatments of Example 2 within the 200 nm to 450 nm wavelength range.
Figure 3:
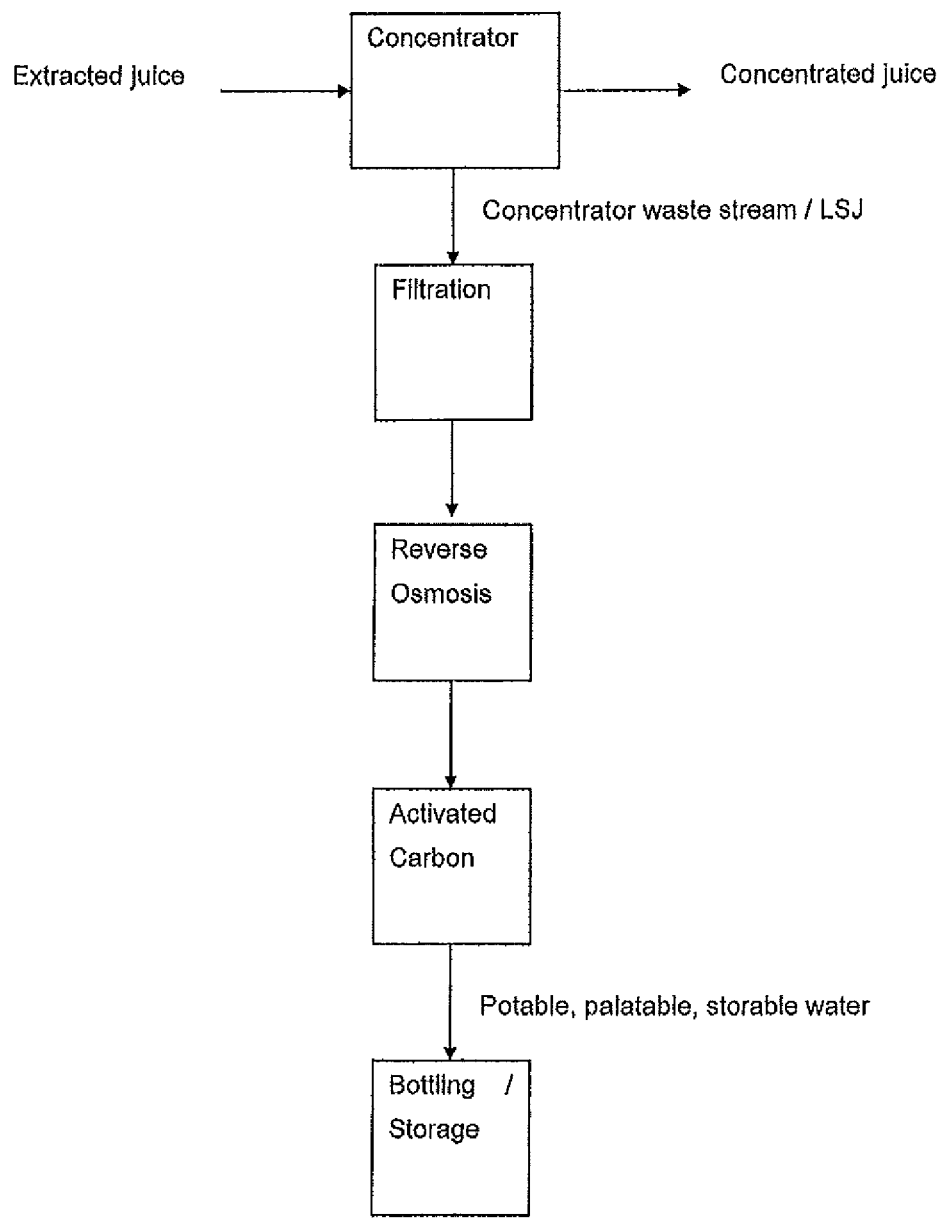
FIG. 3 shows a block flow diagram of a preferred LSJ treatment, including sourcing of the LSJ from an extracted juice concentrator.

FIGS. 1 and 2 show the following:
1. Purified laboratory water, known for its total neutrality in both composition, aroma and taste is used as a spectral reference point in order to visually determine which applied process improves the neutrality of the LSJ. This water on the Y axis is closest to zero Abs.
2. Raw LSJ, in contrast is the line that shows greater than 1.0 Abs on the Y-axis (FIG. 1) and above 0.1 Abs on the Y-axis (FIG. 2).
3. The LSJ treated with RO and GAC combined is the second line from zero Abs on the Y-axis.
4. Potable Tap water (Australian) intercepts the Y-axis at the same point as 3 above.

LSJ that has been treated with RO followed by GAC is the closest spectral profile to the purified laboratory water. This process produces a LSJ product that is similar to potable tap water. The LSJ treated with just GAC was not as good in quality but acceptable for is consumption.

Such spectral analysis in the laboratory can be used to determine the treatment process the raw LSJ requires in order to achieve similar spectral properties as potable water that is used in any part of the world.

Analysis of the above continuous spectra reveals that relative to purified laboratory water, raw grape LSJ has several peaks. The first peak has been identified at 275 nm and ends at 254 nm. The second peak continues and can be seen at it's highest at 200 nm wavelength. Using this characteristic of raw grape LSJ that has been extracted from grapes by evaporation, the effectiveness of the treatment protocols can be easily quantified by measuring and comparing the absorbance of the treated and reference waters at the above wavelengths. This is shown in Table 4 below.

TABLE 4

| Sample/process | A275 nm | A254 nm | A200 nm | A420 nm |
| --- | --- | --- | --- | --- |
| Purified Lab water | 0 | 0 | 0.0001 | 0.0001 |
| Raw LSJ No-treatment | 0.09 | 0.078 | 2.7312 | 0.0069 |
| LSJ + GAC | 0.001 | 0.0006 | 0.233 | 0.0004 |
| LSJ + RO + GAC | 0.0023 | 0.0035 | 0.0974 | 0.0009 |
| Potable Tap water | 0.0024 | 0.0052 | 0.0792 | 0.0005 |

It appears that the above wavelength can be used rather than a scan to optimise the raw LSJ treatment program in order to obtain absorbance values similar to the local potable water.

Having achieved these specifications by the optimum treatment process, it is necessary to finally taste and asses that the aroma and taste profile is acceptable to those who taste it.

This example illustrates a method of analysis of raw LSJ and to determine which process can be used. The skilled person would understand that the process could be repeated for other sources of LSJ, and different wavelengths may need to be selected.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method for producing a beverage, the method comprising the steps of:
providing a fruit or a vegetable or a sugar cane;
treating the fruit or the vegetable or the sugar cane to release or expose the internal constituents to provide a juice;
passing the juice through a concentrator to provide a juice concentrate and a concentrator waste stream, the concentrator waste stream comprising a fermentable sugar;
purifying the concentrator waste stream through a size exclusion process configured to exclude a fermentable sugar to provide a sugar-depleted intermediate; and
filtering the sugar-depleted intermediate through activated carbon to provide a beverage; wherein the juice is passed directly to the concentrator and without passing through an intermediate processing step, and the concentrator waste stream is passed directly to the size exclusion process and without passing through an intermediate processing step.

2. The method of claim 1, wherein the steps are carried out in the order recited.

3. The method of claim 1, wherein the concentrator is an evaporative concentrator.

4. The method of claim 3, wherein the evaporative concentrator is a commercial evaporative juice concentrator.

5. The method of claim 4, wherein the commercial evaporative juice concentrator requires heating of the juice.

6. The method of claim 5, wherein the commercial evaporative juice concentrator is configured to evaporate under conditions of vacuum.

7. The method of claim 3, wherein the evaporative concentrator is configured to keep separate the concentrator waste stream and any external water.

8. The method of claim 1, wherein the concentrator waste stream is a condensate of an evaporative concentrator.

9. The method of claim 1, wherein the concentrator waste stream has a sugar content of greater than about 0.005 Bx.

10. The method of claim 1, wherein the concentrator waste stream has a sugar content of greater than about 0.05 Bx.

11. The method of claim 1, wherein the concentrator waste stream is from a commercial juice concentration process.

12. The method of claim 1, wherein the sugar-depleted intermediate material, which passes into the size exclusion process, has a sugar content of greater than about 0.005 Bx.

13. The method of claim 1, wherein the sugar-depleted intermediate material, which passes into the size exclusion process, has a sugar content of greater than about 0.05 Bx.

14. The method of claim 1, wherein the material which exits the size exclusion process has a sugar content of less than about 0.01 Bx.

15. The method of claim 1, wherein the material which exits the size exclusion process has a sugar content of less than about 0.005 Bx.

16. The method of claim 1, wherein the size exclusion process is a reverse osmosis process or a nanofiltration process.

* * * * *